Figure 1:
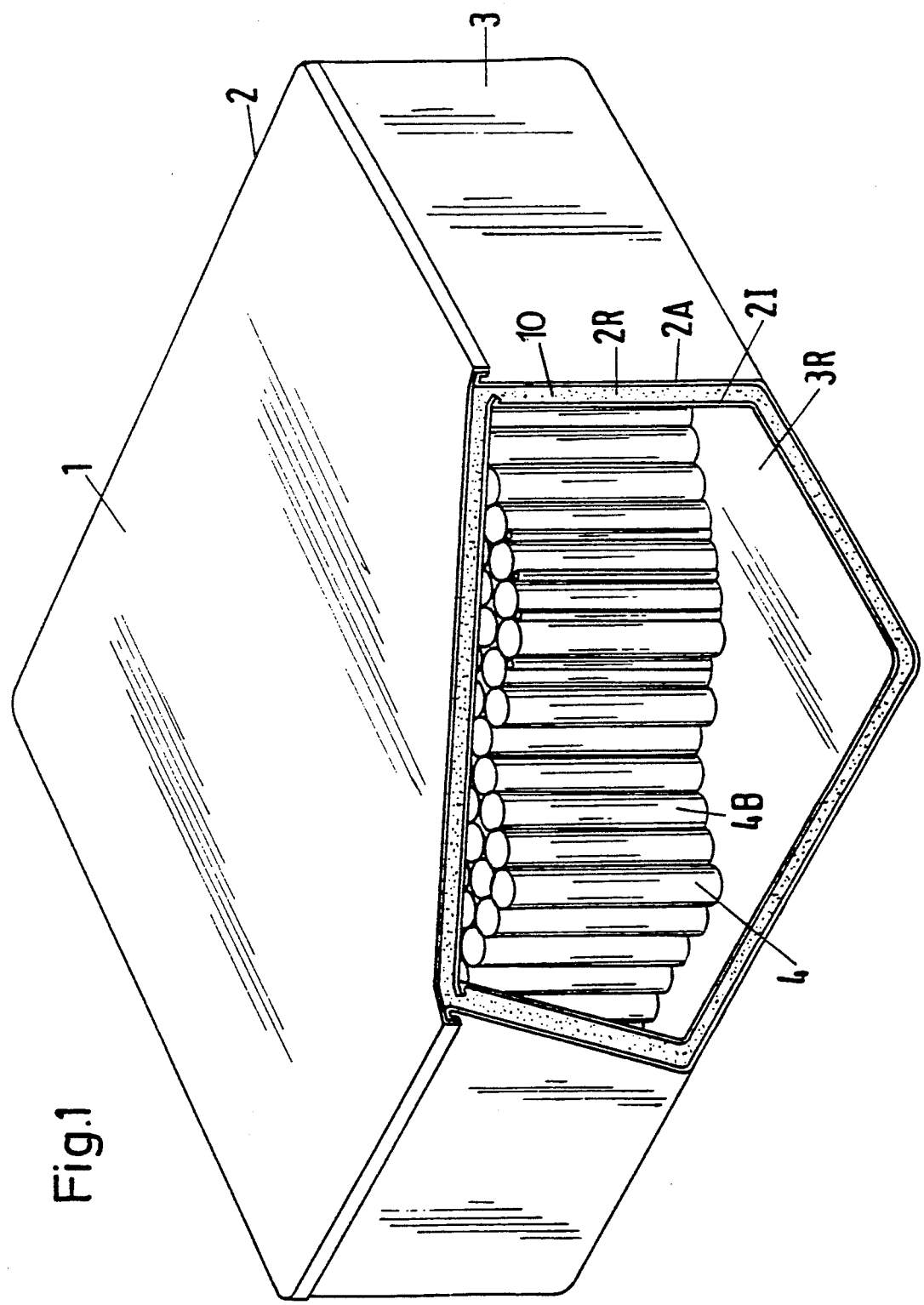

United States Patent [19]

Andres et al.

[11] Patent Number: 5,143,803
[45] Date of Patent: Sep. 1, 1992

[54] HIGH-TEMPERATURE STORAGE BATTERY

[75] Inventors: Walter Andres, Ludwigshafen; Wilfried Flory, Brühl; Stefan Mennicke, Leimen-Gauangelloch, all of Fed. Rep. of Germany

[73] Assignee: ABB Patent GmbH, Mannheim, Fed. Rep. of Germany

[21] Appl. No.: 692,307

[22] Filed: Apr. 26, 1991

[30] Foreign Application Priority Data

Apr. 26, 1990 [DE] Fed. Rep. of Germany ....... 4013268

[51] Int. Cl.5 ........................................... H01M 10/50
[52] U.S. Cl. .................................... 429/120; 429/129; 429/156
[58] Field of Search ..................... 429/120, 129, 156

[56] References Cited

U.S. PATENT DOCUMENTS

| 3,837,918 | 9/1974 | Nakabayashi | 429/120 X |
| 3,965,741 | 10/1975 | Kogiso et al. | 429/120 X |
| 4,883,726 | 11/1989 | Peles et al. | 429/120 |
| 5,034,290 | 7/1991 | Sands et al. | 429/120 |

Primary Examiner—Stephen Kalafut
Attorney, Agent, or Firm—Herbert L. Lerner; Laurence A. Greenberg

[57] ABSTRACT

A high-temperature storage battery is assembled from a multiplicity of electrically interconnected storage cells. A retainer holds the storage cells together to form a storage cell block. The storage cells are embedded in a mixture being formed of at least one coarse-grained material and at least one binder. By melting and subsequent complete curing of the binder, a concrete-like mass is formed, in which the storage cells are undetachably embedded.

12 Claims, 2 Drawing Sheets

HIGH-TEMPERATURE STORAGE BATTERY

The invention relates to a high-temperature storage battery having a thermal insulation with an inner space in which interconnected storage cells are disposed and combined by means of a retainer, at least into one storage cell block.

Such high-temperature storage batteries, which are assembled from electrochemical storage cells based on alkali metal and chalcogen, are being increasingly used as an energy source for electric drives of vehicles. The heretofore-known high-temperature storage batteries with electrochemical storage cells of the above-mentioned type operate at a temperature between 300° C. and 350° C. In order to avoid heat losses, in particular during the idle periods of the high-temperature storage batteries, they are surrounded by a thermal insulation. The thermal insulation is bounded by a double-walled casing defining an inner space between the walls being evacuated and filled with an insulating material. The inner space of the insulation serves for receiving the storage cells. Retainers are provided in order to ensure that the storage cells remain permanently in the position to which they are assigned during installation. In this case metal structures are employed. With the use of such components, compromises have to be made between the rigidity of the structure on one hand and the volume and weight of the same on the other hand. However, since the energy density in relation to the mass and the volume is an important characteristic of the high-temperature storage battery, usually the requirements for resistance to breakage, and stability under the effect of tensile and compressive forces on the retainers, have to be reduced. Furthermore, the known retainers lack the necessary insulation which, for example, prevent the potential of a defective storage cell being impressed on the entire retainer.

It is accordingly an object of the invention to provide a high-temperature storage battery, which overcomes the hereinafore-mentioned disadvantages of the heretofore-known devices of this general type.

With the foregoing and other objects in view there is provided, in accordance with the invention, a high-temperature storage battery, comprising a thermal insulation having an inner space, interconnected storage cells disposed in the inner space, and a retainer formed of an electrically non-conductive material at least regionally surrounding and combining the storage cells into at least one storage cell block and permanently holding the storage cells in a position fixed during assembly.

The materials used for producing the retainer are corrosionresistant to sodium, sulphur and sodium polysulphide. In addition, during the assembly of the high-temperature storage battery and during operation of the same, it has an electrical resistivity of greater than $10^8$ ohms $\times$ cm. This is necessary since storage cells having reactants which are separated by a solid electrolyte, are sensitive to current loads in the cold, connected-up state.

In accordance with another feature of the invention, the retainer is formed of at least one coarse-grained material serving as a filler material, at least one binder selected from the group consisting of inorganic and organic binders, and if necessary an additive for improving strength.

In accordance with a further feature of the invention, the filler material is mixed with or coated with the binder.

The mixture of a coarse-grained material with an organic or inorganic binder or the coating of a coarse grained material with such a binder produces a starting material with which a retainer for storage cells which can withstand all the forces occurring in the operating state of the high-temperature storage battery, can be produced. The storage cells are embedded in the retainer and are closely and permanently enclosed by it. The cured binder not only surrounds the coarse-grained material but also directly surrounds the storage cells, so that once the binder has cured it is no longer possible for the storage cells to shake loose.

In accordance with an added feature of the invention, the coarse-grained material is selected from the group consisting of corundum, hollow-bead corundum, quartz sand, mullite, glass beads and hollow glass beads. Materials which are similar to these materials may likewise be used as filler material.

In accordance with an additional feature of the invention, the coarse-grained filler material is selected from the group consisting of electrically non-conductive oxides of elements of groups II, III, IV, IIIb, IVb of the chemical periodic system, mixtures of the oxides and compounds of the oxides. The use of a mixture of the first-mentioned materials and the oxides is likewise possible.

The particle size of the material serving as filler material is chosen in such a way that the average diameter lies substantially between 20 and 1000 $\mu$m. These are materials which are free-flowing at room temperature.

In accordance with yet another feature of the invention, the binder is selected from the group consisting of a thermoset resin in the form of silicone resin, a thermoset resin in the form of phenolic resin and a thermoset resin in the form of mixture of silicone and phenolic resin.

Special glasses may likewise be used as a binder. The thermoset resins and the glasses may be produced as granules. They are likewise free-flowing at room temperature. Due to their free-flowability, both the filler materials and the binders can be disposed around the storage cells and in the cavities between the storage cells without any difficulties. The free-flowability can be improved by granulating the mixture or by coating the coarse-grained material with the resin. The materials used as a binder have the advantage of exhibiting only a little shrinkage during curing in the mixture with the filler materials being mentioned. The development of gas from the materials when the high-temperature storage battery is heated up to its operating temperature is so small that the gas can diffuse out from the storage cell block being formed without any problems. This makes it possible to obtain a high-temperature storage battery with good weight-related and electrical data. The binders are chosen in such a way that they begin to melt when the high-temperature storage battery is put into operation and they wet the coarse-grained material serving as filler material. With the use of glass as a binder, coarse-grained materials are used from which constituents that promote the crystallizing of the glass are released. With the use of resin as a binder, melting of the same is followed by a cross-linking of the polymer, which subsequently cures. Both with the use of glass and with the use of a thermoset resin, a block of a concrete-like mass is produced, in which the storage cells and the switching elements are embedded in such a way that a storage cell block that completely fills the inner area of the battery box is formed.

In accordance with yet an added feature of the invention, the binder is a glass vitrifying at a temperature at most equal to 300° C. and crystallizing by means of released constituents from the filler material.

In accordance with yet an additional feature of the invention, the binder is a glass having a softening point lying below 350° C. being raised to a temperature above 350° C. by releasing constituents from the coarse-grained material.

In accordance with again another feature of the invention, the retainer is made from substantially 70% quartz sand having an average particle size of substantially 300 μm, substantially 24% microglass beads having an average particle size of substantially 50 μm and a proportion of substantially 6% silicone resin.

In accordance with again a further feature of the invention, there is provided substantially from 0.5 to 5% of a material selected from the group consisting of borate, silicate and phosphate of an alkali metal being mixed-in as an additive with the quartz sand, the microglass beads and the silicone resin.

In accordance with again an added feature of the invention, the retainer is produced from substantially 88 to 99% quartz sand, substantially 1 to 12% silicone resin and substantially 0.5 to 5% sodium pyrophosphate.

In accordance with again an additional feature of the invention, the retainer has at least an electrical resistivity of $10^4$ ohms × cm during production and during operation.

Other features which are considered as characteristic for the invention are set forth in the appended claims.

Although the invention is illustrated and described herein as embodied in a high-temperature storage battery, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
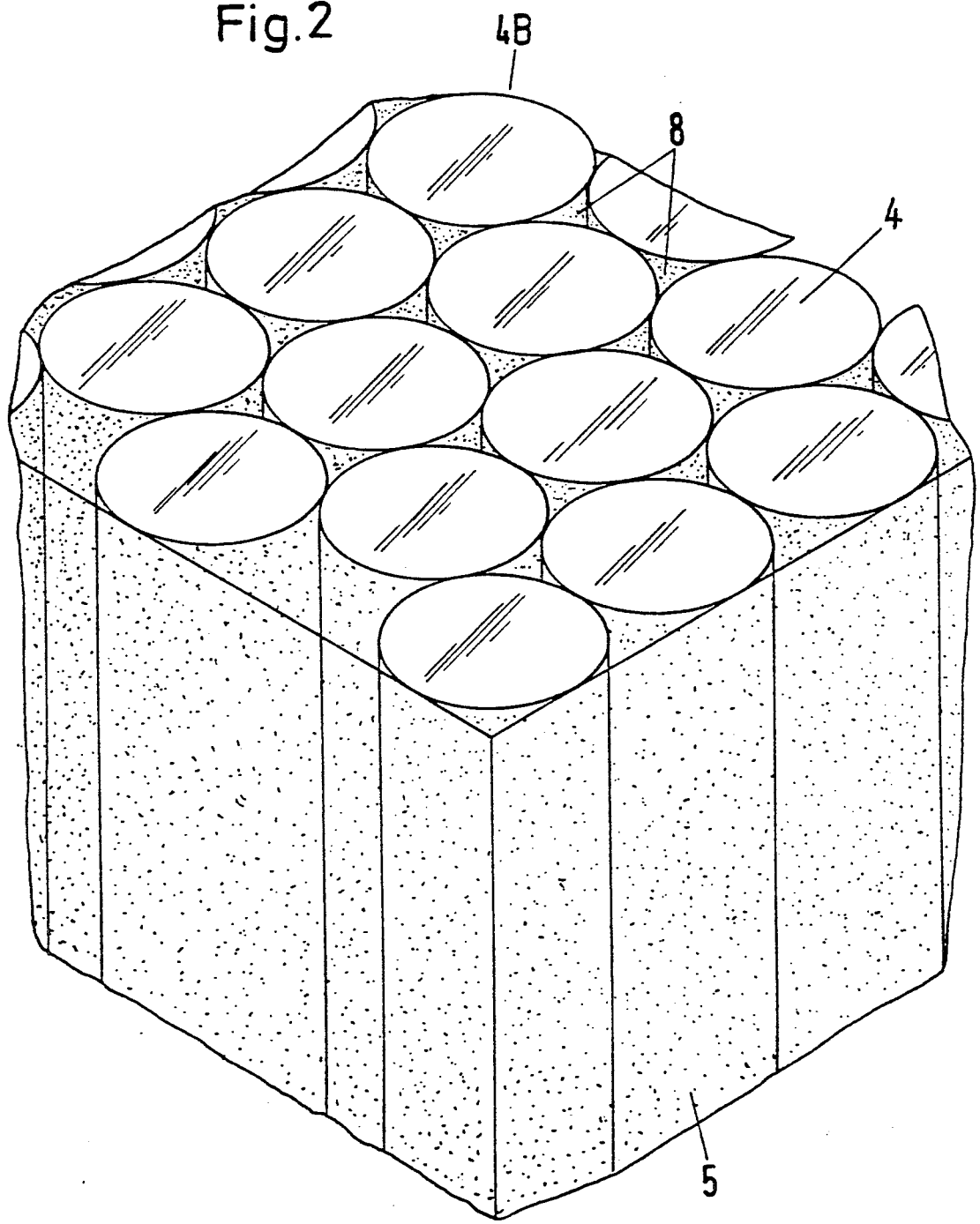

FIG. 1 is a diagrammatic, partially broken-away perspective view of a high-temperature storage battery; and FIG. 2 is a fragmentary, perspective view of a storage cell block, as fitted into the high-temperature storage battery according to FIG. 1.

Referring now to the figures of the drawings in detail and first, particularly, to FIG. 1 thereof, there is seen a high-temperature storage battery 1 which is bounded or bordered by an insulation 3, having an inner space 3R in which a multiplicity of storage cells 4 are disposed and electrically interconnected. The thermal insulation 3 is formed by a double-walled casing 2. The casing 2 has respective inner and outer walls 2A and 2I, defining a space 2R therebetween, which is filled with insulating material 10 and additionally evacuated. The storage cells 4 are combined to form a storage cell block or a cell matrix 4B. During assembly of the high-temperature storage battery 1, the storage cells 4 are disposed in such a way that their longitudinal axes run parallel to one another and to a vertical plane. In order to ensure that the storage cells 4 are held in this position even in the event of extreme force effects from outside, as FIG. 2 shows, they are permanently joined together by a retainer 5 to form the above-mentioned storage cell block 4B. This retainer 5 is formed of a coarse-grained material serving as filler material, which is mixed with or coated by a thermoset resin or a glass. During assembly of the high-temperature storage battery 1, this coarse-grained material and the thermoset resin or a corresponding glass are disposed around the storage cells 4 and in intermediate spaces 8 between the storage cells 4, in such a way that all of the storage cells 4 are embedded all around in this material. The coarse-grained material is corundum, hollow-bead corundum, quartz sand, mullite, glass beads, hollow glass beads or chemically similar materials. Electrically non-conductive oxides of elements of groups II, III, IV, IIIb and IVb of the chemical periodic system or mixtures of these oxides or non-conductive compounds thereof may likewise be used as coarse-grained material. The same applies to mixtures of the first-mentioned material and such oxides and their compounds. The proportion of the coarse-grained material is substantially 70-99%. This coarse-grained material, serving as a filler, has an average diameter of substantially from 20 to 1000 μm. The remaining proportion of the material disposed around the storage cells 4 and in the intermediate spaces 8 is preferably formed of a silicone resin or a phenolic resin or a mixture thereof. The resin may be disposed together with the coarse-grained material in the form of granules around the storage cells 4 and in the intermediate spaces 8. There is also the possibility of coating the coarse-grained material with the resin. When putting the battery into operation, in particular during a first heating-up of the same, the glass or resin begins to melt and wets the filler material. With a further increase of the temperature during operation of the battery, the glass or resin cross-links and cures and forms a unit, especially the retainer 5, along with the coarse-grainer material. At an operating temperature of substantially from 300° to 350° C. during further operation of the battery, the glass or resin remains in this cured state. Therefore, only the retainer 5 and not the coarse-grained material and the glass or resin can be seen in FIG. 2. In order to increase the strength of the resin, or to ensure that this cured state of the resin is preserved even with an increase of the temperature to values far above 350° C., an additive of 0.5 to 5% borate, silicate or phosphate of an alkali metal is mixed-in with the coarse-grained material and the resin. This ensures that the solidified state of the resin is increased or retained in the event of an undesired temperature increase to values above 3503 C., so that the storage cells 4 are retained firmly in the composite structure of the storage cell block 4B even during or after such an operational fault. In the case of a preferred embodiment, the retainer 5 is substantially formed of 70% quartz sand having an average particle size of 300 μm, 24% microglass beads having an average diameter of 50 μm, as well as 5% silicone resin and 1% sodium pyrophosphate. The storage cell block 4B can be held together just as well by the use of substantially from 88 to 90% quartz sand of the above-specified particle size, 1 to 12% silicone resin and 0.5 to 5% sodium pyrophosphate. The same applies if a mixture of quartz sand and aluminum oxide is used as the filler material. According to the invention, there is the possibility of replacing the resin by a glass. For this purpose, a glass is chosen which vitrifies at 350° C. or below and crystallizes under the effect of constituents which are released from the filler material. Glasses having a softening point which lies below 350° C. and is increased by constituents which are released from the filler material may also be used. In both cases, the filler materials are to be chosen in such a way that they contain constituents which are suitable for this purpose and are released. The above-described retainer 5, produced from a coarse grained material, a binder and, if appropriate, an additive to increase the strength, is not only suitable for holding together storage cells based on sodium and sulphur. Rather, the material described above can also be used for holding together storage cells based on $NaFeCl_2$ or $NaNiCl_2$.

We claim:

1. High-temperature storage battery, comprising a thermal insulation having an inner space, interconnected storage cells disposed in said inner space, and a retainer formed of an electrically non-conductive material at least regionally surrounding and combining said storage cells into at least one storage cell block and permanently holding said storage cells in a position fixed during assembly, said retainer being formed of at least one coarse-grained material serving as a filler material and at least one binder selected from the group consisting of inorganic and organic binders.

2. High-temperature storage battery according to claim 1, wherein said filler material is mixed with said binder.

3. High-temperature storage battery according to claim 1, wherein said filler material is coated with said binder.

4. High-temperature storage battery according to claim 1, wherein said coarse-grained material is selected from the group consisting of corundum, quartz sand, mullite, and glass beads.

5. High-temperature storage battery according to claim 1, wherein said coarse-grained filler material is selected from the group consisting of electrically non-conductive oxides of elements of groups II, III, IV, IIIb, IVb of the chemical periodic system, mixtures of said oxides and compounds of said oxides.

6. High-temperature storage battery according to claim 1, wherein said binder is selected from the group consisting of a thermoset resin in the form of silicone resin, a thermoset resin in the form of phenolic resin and a thermoset resin in the form of mixture of silicone and phenolic resin.

7. High-temperature storage battery according to claim 1, wherein said binder is a glass vitrifying at a temperature at most equal to 300° C. and crystallizing by means of released constituents from said filler material.

8. High-temperature storage battery according to claim 1, wherein said binder is a glass having a softening point lying below 350° C. being raised to a temperature above 350° C. by releasing constituents from said coarse-grained material.

9. High-temperature storage battery according to claim 1, wherein said retainer is made from substantially 70% quartz sand having an average particle size of substantially 300 μm, substantially 24% microglass beads having an average particle size of substantially 50 μm and a proportion of substantially 6% silicone resin.

10. High-temperature storage battery according to claim 9, including substantially from 0.5 to 5% of a material selected from the group consisting of borate, silicate and phosphate of an alkali metal being mixed-in as an additive with said quartz sand, said microglass beads and said silicone resin.

11. High-temperature storage battery according to claim 1, wherein said retainer is produced from substantially 88 to 99% quartz sand, substantially 1 to 12% silicone resin and substantially 0.5 to 5% sodium pyrophosphate.

12. High-temperature storage battery according to claim 1, wherein said retainer has at least an electrical resistivity of $10^4$ ohms × cm during production and during operation.

* * * * *